US012735559B2

(12) United States Patent
Nakahara et al.

(10) Patent No.: US 12,735,559 B2
(45) Date of Patent: Sep. 15, 2026

(54) IONOMER RESIN

(71) Applicant: Kuraray Europe GmbH, Hattersheim (DE)

(72) Inventors: Atsuhiro Nakahara, Tsukuba (JP); Takuro Niimura, Tsukuba (JP); Kenta Takemoto, Tsukuba (JP); Yoshiaki Asanuma, Kurashiki (JP)

(73) Assignee: Kuraray Europe GmbH, Hattersheim (DE)

( * ) Notice: Subject to any disclaimer, the term of this patent is extended or adjusted under 35 U.S.C. 154(b) by 601 days.

(21) Appl. No.: 18/038,972

(22) PCT Filed: Nov. 19, 2021

(86) PCT No.: PCT/JP2021/042630

§ 371 (c)(1),
(2) Date: May 25, 2023

(87) PCT Pub. No.: WO2022/113906

PCT Pub. Date: Jun. 2, 2022

(65) Prior Publication Data

US 2024/0002645 A1 Jan. 4, 2024

(30) Foreign Application Priority Data

Nov. 27, 2020 (JP) ................................ 2020-197524

(51) Int. Cl.

| | |
|---|---|
| ***C08L 23/0876*** | (2025.01) |
| ***B32B 17/10*** | (2006.01) |
| ***C08F 8/44*** | (2006.01) |
| ***C08F 220/14*** | (2006.01) |
| ***C08F 220/18*** | (2006.01) |
| ***C08J 5/18*** | (2006.01) |

(52) U.S. Cl.

CPC .... *C08L 23/0876* (2013.01); *B32B 17/10036* (2013.01); *B32B 17/10743* (2013.01); *B32B 17/10935* (2013.01); *C08F 8/44* (2013.01); *C08F 220/14* (2013.01); *C08F 220/1802* (2020.02); *C08J 5/18* (2013.01); *B32B 2250/03* (2013.01); *B32B 2250/40* (2013.01); *B32B 2307/412* (2013.01); *B32B 2315/08* (2013.01); *B32B 2323/00* (2013.01); *B32B 2333/12* (2013.01); *B32B 2419/00* (2013.01); *B32B 2605/00* (2013.01); *C08L 2201/10* (2013.01)

(58) Field of Classification Search

CPC .... C08F 220/06; C08F 220/14; C08F 220/18; C08L 23/0876

USPC .................................................... 526/318.45

See application file for complete search history.

(56) References Cited

U.S. PATENT DOCUMENTS

| | | | | |
|---|---|---|---|---|
| 6,432,522 | B1 | 8/2002 | Friedman | |
| 10,160,891 | B2 * | 12/2018 | Dodge | C09J 4/06 |
| 2009/0151772 | A1 * | 6/2009 | Hayes | H10F 19/80 156/60 |

FOREIGN PATENT DOCUMENTS

| | | | |
|---|---|---|---|
| JP | S5823850 | A | 2/1983 |
| JP | S6079008 | A | 5/1985 |
| JP | S63270709 | A | 11/1988 |
| JP | H06501519 | A | 2/1994 |
| JP | 2011507278 | A | 3/2011 |
| JP | 2016079408 | A | 5/2016 |
| JP | 2017519083 | A | 7/2017 |

OTHER PUBLICATIONS

International Search Report issued Feb. 1, 2022 in PCT/JP2021/042630 (with English translation), 5 pages.

* cited by examiner

*Primary Examiner* — Vickey Nerangis
(74) *Attorney, Agent, or Firm* — Element IP, PLC

(57) ABSTRACT

The present invention relates to an ionomer resin comprising a carboxylic acid ester unit (A), a carboxylic acid unit (B), a neutralized carboxylic acid unit (C), and an ethylene unit (D), wherein, based on the total of monomer units constituting the ionomer resin, the content of the carboxylic acid ester unit (A) is 0.01 to 1.8 mol %, and the total content of the carboxylic acid ester unit (A), the carboxylic acid unit (B), and the neutralized carboxylic acid unit (C) is 6 to 10 mol %, and based on measurement of the molecular weight in terms of polyethylene by GPC with the carboxylic acid unit (B) and the neutralized carboxylic acid unit (C) being converted into a methyl carboxylate unit, the ratio of a low-molecular-weight component having a molecular weight of 2,500 g/mol or less obtained from an integral molecular weight distribution curve is 2.6 to 4.0 mass %, and the number average molecular weight is 8,000 to 14,000 g/mol.

12 Claims, No Drawings

IONOMER RESIN

TECHNICAL FIELD

The present invention relates to an ionomer resin capable of forming a resin sheet that can be used as an interlayer film for laminated glass or the like, a resin composition comprising the ionomer resin, a resin sheet comprising the ionomer resin or the resin composition, and laminated glass comprising the resin sheet.

BACKGROUND ART

An ionomer resin that is a neutralized product of an ethylene-unsaturated carboxylic acid copolymer is excellent in transparency and adhesiveness to glass and is therefore used for an interlayer film of laminated glass (for example, Patent Document 1). In recent years, the required performance for laminated glass has been increased, and an ionomer resin has become increasingly required to retain high transparency regardless of the production conditions of laminated glass, to show less coloration and have excellent appearance, to have high self-supporting ability even under a high-temperature environment, and to have high adhesive strength even when laminated glass is laminated at a lower temperature than ever.

For example, Patent Document 2 discloses an ionomer resin obtained by introducing 5 to 15 mass % of a derivative of an α, β-unsaturated carboxylic acid as a third component into an ethylene-unsaturated carboxylic acid copolymer, and the transparency of this ionomer resin is improved.

PRIOR ART DOCUMENTS

Patent Documents

Patent Document 1: U.S. Pat. No. 6,432,522
Patent Document 2: JP-A-2017-519083

SUMMARY OF THE INVENTION

Problems to be Solved by the Invention

However, according to the study conducted by the present inventors, it has been found that the ionomer resin as in Patent Document 2 does not sufficiently have high transparency, a low colorability, and high self-supporting ability under a high-temperature environment required for an interlayer film of laminated glass. Furthermore, it has been found that when the ionomer resin as in Patent Document 2 is bonded to glass at a temperature lower than that in a conventional case, sufficient adhesive strength to glass cannot be exhibited, and high strength cannot be maintained because the relaxation modulus after a long period of time is low.

Therefore, an object of the present invention is to provide an ionomer resin capable of forming a resin sheet that is excellent in transparency and self-supporting ability under a high-temperature environment, has a low colorability, has sufficient adhesiveness to glass even when bonded to laminated glass at a temperature lower than that in a conventional case, and can maintain high strength even after a long period of time, a resin composition comprising the ionomer resin, a resin sheet comprising the ionomer resin or the resin composition, and laminated glass comprising the resin sheet.

Means for Solving Problems

As a result of intensive studies to solve the above problems, the present inventors have found that the above problems can be solved when in an ionomer resin comprising a carboxylic acid ester unit (A), a carboxylic acid unit (B), a neutralized carboxylic acid unit (C), and an ethylene unit (D), the content of the carboxylic acid ester unit (A) is 0.01 to 1.8 mol %, the total content of these units is 6 to 10 mol %, a specific number average molecular weight in terms of polyethylene is 8,000 to 14,000 g/mol, and the ratio of a low-molecular-weight component having a molecular weight of 2,500 or less is 2.6 to 4.0 mass %, so that the present invention has been completed. That is, the present invention includes the followings.

[1] An ionomer resin comprising a carboxylic acid ester unit (A), a carboxylic acid unit (B), a neutralized carboxylic acid unit (C), and an ethylene unit (D),
wherein, based on the total of monomer units constituting the ionomer resin, the content of the carboxylic acid ester unit (A) is 0.01 to 1.8 mol %, and the total content of the carboxylic acid ester unit (A), the carboxylic acid unit (B), and the neutralized carboxylic acid unit (C) is 6 to 10 mol %, and
based on measurement of a molecular weight in terms of polyethylene by gel permeation chromatography (GPC) with the carboxylic acid unit (B) and the neutralized carboxylic acid unit (C) being converted into a methyl carboxylate unit, a ratio of a low-molecular-weight component having a molecular weight of 2,500 or less obtained from an integral molecular weight distribution curve is 2.6 to 4.0 mass %, and the number average molecular weight is 8,000 to 14,000 g/mol.

[2] The ionomer resin according to [1], wherein a content of the neutralized carboxylic acid unit (C) is 0.1 to 3.0 mol %.

[3] The ionomer resin according to [1] or [2], wherein a content of the carboxylic acid unit (B) is 1.0 to 10.0 mol %.

[4] The ionomer resin according to any one of [1] to [3], wherein the carboxylic acid ester unit (A) is a (meth) acrylic acid ester unit.

[5] A method for producing the ionomer resin according to any one of [1] to [4], comprising:
step (I) of saponifying a part of an ethylene-carboxylic acid ester copolymer (X); and
step (II) of demetallizing at least a part of the saponified product obtained in step (I),
wherein the content of a carboxylic acid ester unit contained in the ethylene-carboxylic acid ester copolymer (X) is 6 to 10 mol % based on the total of monomer units constituting the ethylene-carboxylic acid ester copolymer.

[6] A resin composition comprising 90 mass % or more of the ionomer resin according to any one of [1] to [4] with respect to the mass of the resin composition.

[7] A resin sheet comprising the ionomer resin according to any one of [1] to [4] or the resin composition according to [6].

[8] The resin sheet according to [7], wherein a relaxation modulus after $2.6\times10^6$ seconds based on a master curve prepared at 50° C. is 0.25 MPa or more.

[9] Laminated glass comprising two glass plates and an interlayer film disposed between the two glass plates, wherein the interlayer film is the resin sheet according to [7] or [8].

Effects of the Invention

The ionomer resin of the present invention can form a resin sheet that is excellent in transparency and self-supporting ability under a high-temperature environment, has a low colorability, has sufficient adhesiveness to glass even when bonded to glass at a lower temperature than that in a conventional case, and can maintain high strength even after a long period of time. Therefore, the ionomer resin can be suitably used as an interlayer film for laminated glass.

Embodiments of the Invention

[Ionomer Resin]

An ionomer resin of the present invention comprises a carboxylic acid ester unit (A), a carboxylic acid unit (B), a neutralized carboxylic acid unit (C), and an ethylene unit (D), wherein, based on the total of monomer units constituting the ionomer resin, the content of the carboxylic acid ester unit (A) is 0.01 to 1.8 mol %, and the total content (hereinafter may be referred to as a "total content of the units (A) to (C)") of the carboxylic acid ester unit (A), the carboxylic acid unit (B), and the neutralized carboxylic acid unit (C) is 6 to 10 mol %, and based on measurement of the molecular weight in terms of polyethylene by GPC with the carboxylic acid unit (B) and the neutralized carboxylic acid unit (C) being converted into a methyl carboxylate unit, the ratio of a low-molecular-weight component having a molecular weight of 2,500 or less obtained from an integral molecular weight distribution curve is 2.6 to 4.0 mass %, and the number average molecular weight is 8,000 to 14,000 g/mol. In the present specification, the term "unit" means a "constitutional unit derived from", and for example, the carboxylic acid ester unit refers to a constitutional unit derived from a carboxylic acid ester, the carboxylic acid unit refers to a constitutional unit derived from a carboxylic acid, the neutralized carboxylic acid unit refers to a constitutional unit derived from a neutralized carboxylic acid, and the ethylene unit refers to a constitutional unit derived from ethylene. In the present specification, "(meth)acrylic acid" refers to methacrylic acid or acrylic acid.

The present inventors have conducted studies focusing on monomer units and the molecular weight of an ionomer resin and consequently found that, unexpectedly, improvement of transparency, improvement of self-supporting ability under a high-temperature environment, and reduction of the colorability of a resin sheet comprising the ionomer resin can be achieved, reduction of strength of the resin sheet can be effectively suppressed even after a long period of time, and high low-temperature adhesiveness can be exhibited, when the number average molecular weight is adjusted to 8,000 to 14,000 g/mol and the ratio of a low-molecular-weight component having a molecular weight of 2,500 g/mol or less is adjusted to 2.6 to 4.0 mass % in a specific ionomer resin comprising 0.01 to 1.8 mol % of the carboxylic acid ester unit (A), the carboxylic acid unit (B), the neutralized carboxylic acid unit (C), and the ethylene unit (D) and having a total content of the units (A) to (C) of 6 to 10 mol %. In the present specification, the self-supporting ability under a high-temperature environment means a characteristic that broken glass hardly penetrates the resin sheet (interlayer film for laminated glass) or a characteristic that the resin sheet hardly drips even when the glass is broken under a high-temperature environment in the case where the resin sheet is used for laminated glass as the interlayer film for laminated glass. The low-temperature adhesiveness means, for example, a characteristic that glass and the resin sheet are easily bonded when the resin sheet is bonded to the glass at a lower temperature than that in a conventional case in a thermocompression bonding step described later. The colorability means a characteristic of being easily colored. The transparency of the resin sheet means the transparency of the resin sheet itself and/or the transparency of laminated glass formed using the resin sheet as the interlayer film. In the present specification, the relaxation modulus after a long period of time may be abbreviated as "long-time relaxation modulus".

The reason why the resin sheet of the present invention can particularly achieve both excellent low-temperature adhesiveness and excellent strength after a long period of time is presumed to be that, because 2.6 mass % or more of the low-molecular-weight component is contained, the melted ionomer resin can follow irregularities of an interface between the glass and the resin sheet (interlayer film) in the thermocompression bonding step in the production of laminated glass to effectively improve adhesiveness and that decrease in the relaxation modulus during long-term use can be effectively suppressed because the number average molecular weight of the ionomer resin is adjusted to 8,000 to 14,000 g/mol, and the amount of the low-molecular-weight component is suppressed to 4.0 mass % or less.

In the ionomer resin of the present invention, when the molecular weight in terms of polyethylene is measured by GPC with the carboxylic acid unit (B) and the neutralized carboxylic acid unit (C) being converted into a methyl carboxylate unit, the number average molecular weight, which may be referred to as Mn, is 8,000 to 14,000 g/mol, and the ratio of the low-molecular-weight component having a molecular weight of 2,500 or less obtained from the integral molecular weight distribution curve is 2.6 to 4.0 mass %. In the present specification, the number average molecular weight when the molecular weight in terms of polyethylene is measured by GPC with the carboxylic acid unit (B) and the neutralized carboxylic acid unit (C) being converted into a methyl carboxylate unit may be simply referred to as a "number average molecular weight" or "Mn", and the low-molecular-weight component having a molecular weight of 2,500 g/mol or less obtained from the integral molecular weight distribution curve may be simply referred to as a "low-molecular-weight component". When the number average molecular weight of the ionomer resin is less than 8,000 g/mol, there is a tendency that sufficient strength of the resulting resin sheet after a long period of time is not obtained, and when the number average molecular weight exceeds 14,000 g/mol, there is a tendency that formability of the ionomer resin is poor. In addition, when the ratio of the low-molecular-weight component in the ionomer resin is less than 2.6 mass %, there is a tendency that sufficient low-temperature adhesiveness of the resulting resin sheet is not obtained, and when the ratio of the low-molecular-weight component exceeds 4.0 mass %, there is a tendency that sufficient strength of the resulting resin sheet after a long period of time is not obtained.

The ionomer resin of the present invention has a number average molecular weight of 8,000 g/mol or more, preferably 8,500 g/mol or more, more preferably 9,000 g/mol or more, still more preferably 9,500 g/mol or more, and 14,000 g/mol or less, preferably 13,500 g/mol or less, more preferably 13,000 g/mol or less. When the number average molecular weight is equal to or more than the above lower limit, decrease in the long-time relaxation modulus of the resulting resin sheet can be suppressed, and thus the strength after a long period of time can be improved. When the number average molecular weight is equal to or less than the above upper limit, the formability of the ionomer resin can be improved.

In the ionomer resin of the present invention, the ratio of the low-molecular-weight component is 2.6 mass % or more, preferably 2.7 mass % or more, more preferably 2.8 mass % or more, still more preferably 3.0 mass % or more, still more preferably 3.2 mass % or more, and 4.0 mass % or less, preferably 3.9 mass % or less. When the ratio of the low-molecular-weight component is equal to or more than the above lower limit, the low-temperature adhesiveness of the resulting resin sheet can be enhanced. When the ratio of the low-molecular-weight component is equal to or less than the above upper limit, decrease in the long-time relaxation modulus of the resulting resin sheet can be suppressed, and thus the strength after a long period of time can be improved.

The number average molecular weight of the ionomer resin in terms of polyethylene and the ratio of the low-molecular-weight component can be calculated as follows. First, the carboxylic acid unit (B) and the neutralized carboxylic acid unit (C) of the ionomer resin are converted into a methyl carboxylate unit, and the chromatogram of the converted ionomer resin is measured by GPC. Next, from a calibration curve prepared using a polystyrene standard polymer, Mn in terms of polyethylene is obtained using a Q factor. The ratio of the low-molecular-weight component having a molecular weight of 2,500 g/mol or less can be calculated from the integral molecular weight distribution calculated using the calibration curve. For the Q factor, reference can be made to "Size Exclusion Chromatography: High-Performance Liquid Chromatography of Polymers" (MORI Sadao, Kyoritsu Shuppan Co., Ltd., 1991), and for example, 41.3 for polystyrene and 17.7 for polyethylene can be used as the Q factors. The number average molecular weight of the ionomer resin in terms of polyethylene and the ratio of the low-molecular-weight component can be calculated, for example, by a method described in the EXAMPLES section.

The ionomer resin of the present invention may be constituted of one ionomer resin or two or more ionomer resins. In the case where the ionomer resin is constituted of two or more ionomer resins, the ionomer resins may have different constitutional units and ratios thereof and may have different molecular weights. In the case where the ethylene-carboxylic acid ester copolymer (X) is used as a raw material, the Mn of the ionomer resin and the ratio of the low-molecular-weight component can be adjusted by appropriately changing the Mn of the ethylene-carboxylic acid ester copolymer (X) and the ratio of the low-molecular-weight component. In the case where two or more ionomer resins are used, for example, ionomer resins having different Mns and/or having different ratios of the low-molecular-weight component may be combined to make adjustment to a desired Mn and a desired ratio of the low-molecular-weight component.

The ionomer resin of the present invention comprises the carboxylic acid ester unit (A), the carboxylic acid unit (B), the neutralized carboxylic acid unit (C), and the ethylene unit (D).

<Carboxylic Acid Ester Unit (A)>

In the ionomer resin of the present invention, examples of the monomer constituting the carboxylic acid ester unit (A) include unsaturated carboxylic acid esters such as (meth) acrylic acid esters such as methyl (meth)acrylate, ethyl (meth)acrylate, n-propyl (meth)acrylate, isopropyl (meth) acrylate, n-butyl (meth)acrylate, isobutyl (meth)acrylate, sec-butyl (meth)acrylate, t-butyl (meth)acrylate, amyl (meth)acrylate, isoamyl (meth)acrylate, n-hexyl (meth)acrylate, cyclohexyl (meth)acrylate, 2-ethylhexyl (meth)acrylate, pentadecyl (meth)acrylate, dodecyl (meth)acrylate, isobornyl (meth)acrylate, phenyl (meth)acrylate, benzyl (meth)acrylate, phenoxyethyl (meth)acrylate, 2-hydroxyethyl (meth)acrylate, 2-methoxyethyl (meth)acrylate, glycidyl (meth)acrylate, and allyl (meth)acrylate; dimethyl itaconate; dimethyl maleate; and diethyl maleate. Among these, a (meth)acrylic acid ester is preferable, methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, and t-butyl (meth) acrylate are more preferable, methyl (meth)acrylate, ethyl (meth)acrylate, n-propyl (meth)acrylate, isopropyl (meth) acrylate, n-butyl (meth)acrylate, and isobutyl (meth)acrylate are still more preferable, methyl (meth)acrylate, ethyl (meth) acrylate, n-butyl (meth)acrylate, and isobutyl (meth)acrylate are still more preferable, and methyl (meth)acrylate is particularly preferable, in the viewpoint of ease of enhancement of the transparency, self-supporting ability under a high-temperature environment, strength after a long period of time, and low-temperature adhesiveness of the resulting resin sheet and ease of reduction of the colorability. Regarding a methacrylic acid ester and an acrylic acid ester, the methacrylic acid ester is preferable because it has excellent thermal decomposition resistance and a low colorability. One carboxylic acid ester unit (A) can be used singly, or a combination of two or more carboxylic acid ester units (A) can be used.

In the ionomer resin of the present invention, the content of the carboxylic acid ester unit (A) is 0.01 to 1.8 mol %, based on the total of the monomer units constituting the ionomer resin.

The content of the carboxylic acid ester unit (A) in the ionomer resin of the present invention is 0.01 mol % or more, preferably 0.03 mol % or more, more preferably 0.05 mol % or more, still more preferably 0.08 mol % or more, and is 1.8 mol % or less, preferably 1.5 mol % or less, more preferably 1.0 mol % or less, still more preferably 0.9 mol % or less, still more preferably 0.8 mol % or less, particularly preferably 0.6 mol % or less, based on the total of the monomer units constituting the ionomer resin. When the content of the carboxylic acid ester unit (A) is equal to or more than the above lower limit, the transparency of the resulting resin sheet can be enhanced, and when the content of the carboxylic acid ester unit (A) is equal to or less than the above upper limit, the self-supporting ability under a high-temperature environment and the strength after a long period of time of the resulting resin sheet can be enhanced.

<Carboxylic Acid Unit (B)>

In the ionomer resin of the present invention, examples of the monomer constituting the carboxylic acid unit (B) include unsaturated carboxylic acids such as acrylic acid, methacrylic acid, itaconic acid, maleic anhydride, monomethyl maleate, and monoethyl maleate. Among these monomers, acrylic acid, methacrylic acid, monomethyl maleate, and monoethyl maleate are preferable, acrylic acid and methacrylic acid are more preferable, and methacrylic acid is still more preferable from the viewpoint of ease of enhancement of the transparency, self-supporting ability under a high-temperature environment, strength after a long period of time, and low-temperature adhesiveness of the resulting resin sheet and ease of reduction of the colorability. One carboxylic acid unit (B) can be used singly, or a combination of two or more carboxylic acid units (B) can be used.

The content of the carboxylic acid unit (B) in the ionomer resin of the present invention is preferably 1.0 mol % or more, more preferably 3.0 mol % or more, still more preferably 4.5 mol % or more, still more preferably 5.0 mol % or more, particularly preferably 5.5 mol % or more, more particularly preferably 5.8 mol % or more, and is preferably 10.0 mol % or less, more preferably 9.0 mol % or less, still more preferably 8.5 mol % or less, still more preferably 8.0 mol % or less, particularly preferably 7.5 mol % or less, based on the total of the monomer units constituting the ionomer resin. When the content of the carboxylic acid unit (B) is equal to or more than the above lower limit, the transparency and the low-temperature adhesiveness of the resulting resin sheet can be enhanced, and when the content of the carboxylic acid unit (B) is equal to or less than the above upper limit, the formability of the ionomer resin can be enhanced.

<Neutralized Carboxylic Acid Unit (C)>

In the ionomer resin of the present invention, the monomer constituting the neutralized carboxylic acid unit (C) is preferably a neutralized product of the monomer constituting the carboxylic acid unit (B). The neutralized product of the carboxylic acid is obtained by substituting a hydrogen ion of the carboxylic acid with a metal ion. Examples of the metal ion include ions of monovalent metals such as lithium, sodium, and potassium; and polyvalent metals such as magnesium, calcium, zinc, aluminum, and titanium. These metal ions can be used singly or in combination of two or more thereof. For example, a combination of one or more types of monovalent metal ions and one or more types of divalent metal ions may be used. One neutralized carboxylic acid unit (C) can be used singly, or a combination of two or more neutralized carboxylic acid units (C) can be used.

The content of the neutralized carboxylic acid unit (C) in the ionomer resin of the present invention is preferably 0.1 mol % or more, more preferably 0.3 mol % or more, still more preferably 0.65 mol % or more, still more preferably 1.0 mol % or more, particularly preferably 1.3 mol % or more, more particularly preferably 1.5 mol % or more, most preferably 1.6 mol % or more, and is preferably 3.0 mol % or less, more preferably 2.7 mol % or less, still more preferably 2.6 mol % or less, still more preferably 2.5 mol % or less, based on the total of the monomer units constituting the ionomer resin. When the content of the neutralized carboxylic acid unit (C) is equal to or more than the above lower limit, the transparency, self-supporting ability under a high-temperature environment, and strength after a long period of time of the resulting resin sheet can be enhanced, and the colorability can be reduced. When the content of the neutralized carboxylic acid unit (C) is equal to or less than the above upper limit, the formability of the ionomer resin can be improved.

In the ionomer resin of the present invention, the total content of the carboxylic acid ester unit (A), the carboxylic acid unit (B), and the neutralized carboxylic acid unit (C) is 6 to 10 mol % based on the total of the monomer units constituting the ionomer resin.

The total content of the carboxylic acid ester unit (A), the carboxylic acid unit (B), and the neutralized carboxylic acid unit (C) in the ionomer resin of the present invention is 6.0 mol % or more, preferably 6.5 mol % or more, more preferably 7.0 mol % or more, still more preferably 7.5 mol % or more, and is preferably 10 mol % or less, more preferably 9.9 mol % or less, still more preferably 9.5 mol % or less, still more preferably 9.3 mol % or less, based on the total of the monomer units constituting the ionomer resin. When the total content of the units (A) to (C) is equal to or more than the above lower limit, the transparency and the low-temperature adhesiveness to glass of the resulting resin sheet can be enhanced, and when the total content of the units (A) to (C) is 10 mol % or less, the formability of the ionomer resin can be enhanced, and the long-time relaxation modulus of the resulting resin sheet is hardly reduced, so that the strength after a long period of time can be enhanced.

In one embodiment of the present invention, when the content (total content of acrylic acid ester unit, acrylic acid unit, and neutralized acrylic acid unit) of acrylic acid/acrylate units among the monomer units constituting the ionomer resin is larger than the content (total content of methacrylic acid ester unit, methacrylic acid unit, and neutralized methacrylic acid unit) of methacrylic acid/methacrylate units, it is preferable to make the total content of the carboxylic acid ester unit (A), the carboxylic acid unit (B), and the neutralized carboxylic acid unit (C) relatively large. For example, in the case where only the acrylic acid/acrylate units without the methacrylic acid/methacrylate units are constituents, the total content of the units (A) to (C) may be preferably 7.0 mol % or more, more preferably 7.5 mol % or more, still more preferably 8.0 mol % or more, still more preferably 8.5 mol % or more, and may be preferably 9.9 mol % or less, more preferably 9.8 mol % or less, still more preferably 9.7 mol % or less, still more preferably 9.6 mol % or less.

<Ethylene Unit (D)>

The ionomer resin of the present invention comprises the ethylene unit (D). The content of the ethylene unit (D) in the ionomer resin is preferably 90 mol % or more, more preferably 90.1 mol % or more, still more preferably 90.5 mol % or more, still more preferably 90.7 mol % or more, and is preferably 94 mol % or less, more preferably 93.5 mol % or less, still more preferably 93 mol % or less, still more preferably 92.5 mol % or less, based on the total of the monomer units constituting the ionomer resin. When the content of the ethylene unit (D) is equal to or more than the above lower limit, the mechanical properties and formability can be enhanced, and when the content of the ethylene unit (D) is equal to or less than the above upper limit, the transparency and the low-temperature adhesiveness to glass of the resulting resin sheet can be enhanced.

The ionomer resin of the present invention may comprise monomer units other than the carboxylic acid ester unit (A), the carboxylic acid unit (B), the neutralized carboxylic acid unit (C), and the ethylene unit (D). Examples of the other monomer units include propylene, n-butene, isobutene, vinyl acetate, and vinyl alcohol. The other monomer units can be used singly or in combination of two or more thereof. In the case where the ionomer resin comprises the other monomer units, the content thereof may be appropriately selected within a range in which the effect of the present invention is not impaired, and the content is preferably 5 mol % or less, more preferably 3 mol % or less, still more preferably 1 mol % or less, based on the total of the monomer units constituting the ionomer resin.

The contents of the carboxylic acid ester unit (A), the carboxylic acid unit (B), the neutralized carboxylic acid unit (C), and the ethylene unit (D) in the ionomer resin of the present invention can be analyzed through the following procedure. First, the constitutional units in the ionomer resin are identified by pyrolysis gas chromatography (pyrolysis GC-MS), and then the respective contents can be evaluated by nuclear magnetic resonance spectroscopy (NMR) and elemental analysis. It is also possible to combine IR and Raman analysis. It is preferable to remove components other than the ionomer resin by a reprecipitation method or a Soxhlet extraction method before these analyses. The contents of the carboxylic acid ester unit (A), the carboxylic acid unit (B), the neutralized carboxylic acid unit (C), and the ethylene unit (D) in the ionomer resin of the present invention can be calculated, for example, by a method described in the EXAMPLES section.

In one embodiment of the present invention, in the case where the ionomer resin is produced by a method including step (I) (saponification reaction step) and step (II) (demetallization reaction step) using the ethylene-carboxylic acid ester copolymer (X) as a raw material, the content of each of the carboxylic acid ester unit (A), the carboxylic acid unit (B), and the neutralized carboxylic acid unit (C) can be adjusted by changing the degree of reaction in each of reactions for converting the carboxylic acid ester unit in the ethylene-carboxylic acid ester copolymer (X) into the carboxylic acid unit (B) and the neutralized carboxylic acid unit (C) by a saponification reaction and a demetallization reaction. The total content of the units (A) to (C) can be adjusted by changing the ratio between the ethylene unit and the carboxylic acid ester unit in the ethylene-carboxylic acid ester copolymer (X) used as a raw material.

In one embodiment of the present invention, the melting point of the ionomer resin of the present invention is preferably 50° C. to 200° C., more preferably 60° C. to 180° C., still more preferably 80° C. to 150° C., from the viewpoint of ease of enhancement of the transparency and processability. The melting point can be determined, for example, by referring to the method described in JIS K 7121: 2012 and using differential scanning calorimetry (DSC), from the peaktop temperature of the melting peak of the second heating at a cooling rate of −10° C./min and a heating rate of 10° C./min.

In one embodiment of the present invention, the heat of fusion of the ionomer resin of the present invention is preferably 0 J/g to 25 J/g from the viewpoint of ease of enhancement of the transparency. The heat of fusion can be calculated, for example, by referring to the method described in JIS K 7122: 2012 and using DSC, from the area of the melting peak in the second heating at a cooling rate of −10° C./min and a heating rate of 10° C./min.

In one embodiment of the present invention, the melt flow rate (MFR) of the ionomer resin of the present invention measured under conditions of 190° C. and 2.16 Kgf is preferably 0.1 g/10 min or more, more preferably 0.3 g/10 min or more, still more preferably 0.5 g/10 min or more, still more preferably 0.7 g/10 min or more, particularly preferably 0.9 g/10 min or more, and is preferably 50 g/10 min or less, more preferably 30 g/10 min or less, still more preferably 10 g/10 min or less, still more preferably 5 g/10 min or less. When the MFR of the ionomer resin is within the above range, formation with suppressed deterioration due to heat can be facilitated. The MFR of the ionomer resin can be adjusted by changing the molecular weight and the contents of the carboxylic acid ester unit (A), the carboxylic acid unit (B), the neutralized carboxylic acid unit (C), and the ethylene unit (D). The MFR of the ionomer resin of the present invention can be measured, for example, by a method described in the EXAMPLES section.

In one embodiment of the present invention, the degree of branching of the ionomer resin of the present invention per 1,000 carbon atoms is not particularly limited but is preferably 5 to 30, more preferably 6 to 20. Analysis of the degree of branching per 1,000 carbon atoms can be performed, for example, by a DDMAS method using solid-state NMR.

[Method for Producing Ionomer Resin]

A method for producing the ionomer resin of the present invention is not particularly limited, and examples of the method include a method comprising step (I) of saponifying a part of the ethylene-carboxylic acid ester copolymer (X), which may be simply referred to as a copolymer (X); and step (II) of demetallizing at least a part of the saponified product obtained in step (I).

<Step (I)>

In step (I), the ethylene-carboxylic acid ester copolymer (X) is saponified preferably with a strong base to convert a part of the carboxylic acid ester unit into the neutralized carboxylic acid unit, thereby providing an ethylene-carboxylic acid ester-neutralized carboxylic acid copolymer as the saponified product.

The ethylene-carboxylic acid ester copolymer (X) can be obtained, for example, by copolymerizing ethylene and a carboxylic acid ester at a high temperature and a high humidity. As the carboxylic acid ester used as a raw material, for example, the above-mentioned unsaturated carboxylic acid ester can be used. Among those esters, methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, and 2-ethylhexyl (meth)acrylate are preferable, and (meth)acrylic acid esters such as methyl (meth)acrylate, ethyl (meth)acrylate, n-butyl (meth)acrylate, and isobutyl (meth)acrylate are more preferable. Comparing the methacrylic acid ester with the acrylic acid ester, the methacrylic acid ester is preferable from the viewpoint of excellent thermal decomposition resistance of the resulting resin and the low colorability. One carboxylic acid ester can be used singly, or a combination of two or more carboxylic acid esters can be used.

Examples of the ethylene-carboxylic acid ester copolymer (X) include an ethylene-methyl acrylate copolymer, an ethylene-methyl methacrylate copolymer, an ethylene-ethyl acrylate copolymer, an ethylene-ethyl methacrylate copolymer, an ethylene-n-propyl acrylate copolymer, an ethylene-n-propyl methacrylate copolymer, an ethylene-isopropyl acrylate copolymer, an ethylene-isopropyl methacrylate copolymer, an ethylene-n-butyl acrylate copolymer, an ethylene-n-butyl methacrylate copolymer, an ethylene-sec-butyl acrylate copolymer, and an ethylene-sec-butyl methacrylate copolymer. As these copolymers, commercially available products may be used, or the copolymers may be synthesized with reference to US-A-2013/0274424, JP-A-2006-233059, or JP-A-2007-84743.

In a suitable embodiment of the present invention, the method for producing the ionomer resin comprises step (I) and step (II), and the content of the carboxylic acid ester unit contained in the ethylene-carboxylic acid ester copolymer (X) is preferably 6 to 10 mol % based on the total of the monomer units constituting the ethylene-carboxylic acid ester copolymer. When the content of the carboxylic acid ester unit is within the above range, the contents of the carboxylic acid unit (B) and the neutralized carboxylic acid unit (C) in the resulting ionomer resin tend to be adjusted to suitable ranges. The content of the carboxylic acid ester unit in the ethylene-carboxylic acid ester copolymer (X) is preferably 6.0 mol % or more, more preferably 6.5 mol % or more, still more preferably 7.0 mol % or more, still more preferably 7.5 mol % or more, and is preferably 10 mol % or less, more preferably 9.9 mol % or less, still more preferably 9.5 mol % or less, still more preferably 9.3 mol % or less. Since the content of the carboxylic acid ester unit in the copolymer (X) corresponds to the total content of the carboxylic acid ester unit (A), the carboxylic acid unit (B), and the neutralized carboxylic acid unit (C) in the resulting ionomer resin, when the content of the carboxylic acid ester unit in the copolymer (X) is equal to or more than the above lower limit, the transparency and the low-temperature adhesiveness to glass of the resulting resin sheet can be enhanced, and when the content of the carboxylic acid ester unit in the copolymer (X) is 10 mol % or less, the formability of the ionomer resin can be enhanced.

In one embodiment of the present invention, the MFR of the ethylene-carboxylic acid ester copolymer (X) measured under conditions of 190° C. and 2.16 Kgf is preferably 80 g/10 min or more, more preferably 90 g/10 min or more, still more preferably 100 g/10 min or more, still more preferably 150 g/10 min or more, and is preferably 400 g/10 min or less, more preferably 350 g/10 min or less, still more preferably 330 g/10 min or less. By setting the MFR of the ethylene-carboxylic acid ester copolymer (X) within the above range, achievement of both the formability and strength of the resulting ionomer resin is facilitated. The MFR of the ethylene-carboxylic acid ester copolymer (X) can be adjusted by changing the degree of polymerization of the copolymer and the content of the carboxylic acid ester unit. The MFR of the ethylene-carboxylic acid ester copolymer (X) can be measured, for example, by a method described in the EXAMPLES section.

In one embodiment of the present invention, the number average molecular weight (Mn) of the ethylene-carboxylic acid ester copolymer (X) in terms of polyethylene is preferably 8,000 g/mol or more, more preferably 8,500 g/mol or more, still more preferably 9,000 g/mol or more, still more preferably 9,500 g/mol or more, and is preferably 14,000 g/mol or less, more preferably 13,500 g/mol or less, still more preferably 13,000 g/mol or less. When the Mn of the ethylene-carboxylic acid ester copolymer (X) is within the above range, the number average molecular weight of the resulting ionomer resin and the ratio of the low-molecular-weight component tend to be adjusted to the above ranges, so that the formability of the ionomer resin, the low-temperature adhesiveness of the resulting resin sheet, and the strength after a long period of time can be improved. The molecular weights (Mns) of these ethylene-carboxylic acid ester copolymers (X) can be measured in terms of polyethylene using a column (three TSKgel $GMH_{HR}$-H (20) HT in series) and a 1,2,4-trichlorobenzene solvent under the condition of a column temperature of 140° C. The molecular weight in terms of polyethylene can be calculated from a calibration curve prepared using a polystyrene standard polymer using the Q-factor described above. The number average molecular weight of the copolymer (X) and the ratio of the low-molecular-weight component can be adjusted by changing the polymerization conditions of the monomer, such as the types and amounts of the polymerization initiator and the chain transfer agent, the polymerization temperature, and the polymerization style (CSTR, plug flow method, or the like).

In one embodiment of the present invention, the degree of branching of the ethylene-carboxylic acid ester copolymer (X) per 1,000 carbon atoms is not particularly limited but is preferably 5 to 30, more preferably 6 to 20. The degree of branching can be measured by dissolving the ethylene-carboxylic acid ester copolymer in deuterated o-dichlorobenzene by an inverse gated decoupling method by $^{13}$C-NMR. In addition, the degree of branching can be adjusted by changing the polymerization temperature or the like at the time of polymerizing the copolymer (X).

Examples of the strong base that can be preferably used in the saponification reaction in step (I) include sodium hydroxide, potassium hydroxide, and calcium hydroxide, and from the viewpoint of solubility in a solvent used in the saponification reaction and economic efficiency, sodium hydroxide and potassium hydroxide are preferable.

The amount of the strong base to be added is, for example, preferably 100 to 300 parts by mol, more preferably 120 to 250 parts by mol, still more preferably 150 to 200 parts by mol, with respect to 100 parts by mol of the carboxylic acid ester unit of the ethylene-carboxylic acid ester copolymer (X).

In step (I), it is preferable to use a solvent for the saponification reaction. Examples of the solvent used in the saponification reaction include an ether such as tetrahydrofuran and dioxane; a halogen-containing solvent such as chloroform and dichlorobenzene; a ketone having six or more carbon atoms, such as methyl butyl ketone; a mixed solvent of a hydrocarbon compound and an alcohol such as methanol, ethanol, 1-propanol, 2-propanol, and 1-butanol; an aromatic compound such as benzene, toluene, xylene, and ethylbenzene; and a mixed solvent of an aromatic compound and an alcohol. These solvents may be used singly or in combination of two or more thereof.

Among these solvents, from the viewpoint of the solubility of the resin before and after the saponification reaction, preferable solvents are a mixed solvent of a hydrocarbon compound and an alcohol and a mixed solvent of an aromatic compound and an alcohol, and a more preferable solvent is a mixed solvent of an aromatic compound such as toluene and an alcohol such as methanol. The ratio between the hydrocarbon compound or aromatic compound and the alcohol in the mixed solvent may be appropriately selected according to the type of each solvent to be used, and for example, the mass ratio between the hydrocarbon compound or aromatic compound and the alcohol (hydrocarbon compound or aromatic compound/alcohol) may be 50/50 to 90/10.

In step (I), the temperature at which the saponification reaction is performed is preferably 50° C. or higher, more preferably 60° C. or higher, still more preferably 70° C. or higher, particularly preferably 80° C. or higher, and is preferably 180° C. or lower, more preferably 150° C. or lower, still more preferably 120° C. or lower, from the viewpoint of the reactivity and the solubility of the ethylene-carboxylic acid ester copolymer (X).

In step (I), the saponification reaction may be performed in air or in an inert gas such as nitrogen gas and argon gas. The saponification reaction may be performed under normal pressure, under pressure, or under reduced pressure and is preferably performed under pressure.

<Step (II)>

Step (II) is a step of demetallizing at least a part of the saponified product, that is, the whole or a part of the saponified product, obtained in step (I). In the case where a part of the saponified product is demetallized in step (II) (referred to as step (II-a)), a part of the neutralized carboxylic acid unit in the ethylene-carboxylic acid ester-neutralized carboxylic acid copolymer, which is the saponified product, is demetallized preferably with a strong acid to be converted into a carboxylic acid unit, whereby the ionomer resin comprising the carboxylic acid ester unit (A), the carboxylic acid unit (B), the neutralized carboxylic acid unit (C), and the ethylene unit (D) can be obtained. In the case where the whole of the saponified product is demetallized in step (II) (referred to as step (II-b)), the whole of the neutralized carboxylic acid unit in the ethylene-carboxylic acid ester-neutralized carboxylic acid copolymer, which is the saponified product, is preferably demetallized with a strong acid to be converted into a carboxylic acid unit to provide an ethylene-carboxylic acid ester-carboxylic acid copolymer, and then a part of the carboxylic acid unit in the obtained demetallized product is neutralized with a metal ion to be converted into a neutralized (meth)acrylic acid unit, whereby the ionomer resin comprising the carboxylic acid ester unit (A), the carboxylic acid unit (B), the neutralized carboxylic acid unit (C), and the ethylene unit (D) can be obtained.

Step (II) is performed by performing step (II-a) or step (II-b), and from the viewpoint of ease of reduction of the number of reactions to improve the production efficiency of the ionomer resin, it is preferable to produce the ionomer resin by step (II-a).

Examples of the strong acid used in the demetallization reaction in step (II) include hydrochloric acid, nitric acid, sulfuric acid, and toluenesulfonic acid. Among them, inorganic acids such as hydrochloric acid, nitric acid, and sulfuric acid are preferable from the viewpoint of ease of washing and removing a salt generated as a by-product from the strong base used in the saponification reaction and the strong acid used in the demetallization reaction. As the solvent used for the demetallization, the same solvent as the solvent used for the saponification reaction can be selected.

A suitable amount of the strong acid to be added can be selected according to the amount of the strong base to be added to adjust the neutralized carboxylic acid unit (C) to an arbitrary value.

In step (II), the temperature at which the demetallization is performed is preferably 20° C. or higher, more preferably 30° C. or higher, still more preferably 40° C. or higher from the viewpoint of ease of lowering the viscosity of the reaction solution, and is preferably 180° C. or lower, more preferably 150° C. or lower, still more preferably 120° C. or lower from the viewpoint of ease of suppressing excessive progress of corrosion of a transition metal due to the demetallization reaction.

In step (II), as with the saponification reaction, the demetallization may be performed in air or in an inert gas such as nitrogen gas and argon gas. The demetallization may be performed under normal pressure, under pressure, or under reduced pressure.

In step (II-b), examples of a neutralizing agent used when a part of the carboxylic acid unit is neutralized and converted into a neutralized carboxylic acid unit include an ionic compound containing a metal ion. Examples of the metal ion include ions of an alkali metal such as lithium, potassium, and sodium, ions of an alkaline earth metal such as magnesium and calcium, ions of a transition metal such as zinc, nickel, iron, and titanium, and aluminum ions. For example, in the case where the metal ion is a sodium cation, examples of the neutralizing agent include sodium hydroxide, sodium acetate, and sodium hydrogen carbonate. In addition, a polymer such as an ionomer resin containing a sodium carboxylate unit can also be used as the neutralizing agent.

After the demetallization step in step (II-a) or the neutralization step in step (II-b), the crude ionomer resin, which is the reaction product, in the obtained reaction liquid is separated from the reaction mixture and purified, whereby the ionomer resin of the present invention can be obtained. The separation and purification may be performed by a conventional method, for example, separation means such as filtration, washing, concentration, reprecipitation, recrystallization, and silica gel column chromatography. In one embodiment of the present invention, the separation and purification is preferably performed by adding a poor solvent to a solution of the crude ionomer resin to precipitate the granular resin and then washing the precipitated granular resin with a washing liquid, from the viewpoint of ease of washing and removing a salt generated as a by-product. The method for producing the ionomer resin of the present invention may include a step other than step (I) and step (II).

[Resin Composition]

The present invention includes a resin composition comprising the ionomer resin of the present invention. The content of the ionomer resin comprised in the resin composition of the present invention is preferably 90 mass % or more, more preferably 93 mass % or more, still more preferably 95 mass % or more, still more preferably 98 mass % or more, and is preferably 99.9 mass % or less with respect to the mass of the resin composition from the viewpoint of ease of enhancing the transparency, the self-supporting ability under a high-temperature environment, the strength after a long period of time, and the low-temperature adhesiveness of the resulting resin sheet and ease of reducing the colorability.

The resin composition of the present invention may comprise an additive as necessary. Examples of the additive include an ultraviolet absorber, an age resistor, an antioxidant, a thermal degradation inhibitor, a light stabilizer, an anti-stick agent, a lubricant, a release agent, a polymer processing aid, an antistatic agent, a flame retardant, a dye and a pigment, an organic dye, a matting agent, and a phosphor. Among them, an ultraviolet absorber, an age resistor, an antioxidant, a thermal degradation inhibitor, a light stabilizer, an anti-stick agent, a lubricant, a release agent, a polymer processing aid, and an organic dye are preferable. The additives can be used singly or in combination of two or more thereof. The content of the additive can be appropriately determined as long as the effect of the present invention is not impaired but is preferably 10 mass % or less, more preferably 7 mass % or less, still more preferably 5 mass % or less, still more preferably 2 mass % or less, and is preferably 0.1 mass % or more.

The ultraviolet absorber is a compound having an ability to absorb ultraviolet rays and is said to mainly have a function of converting light energy into thermal energy. Examples of the ultraviolet absorber include benzophenones, benzotriazoles, triazines, benzoates, salicylates, cyanoacrylates, oxalic anilides, malonic esters, and formamidines. These may be used singly or in combination of two or more thereof.

Benzotriazoles are preferable as an ultraviolet absorber because they have a high effect of suppressing deterioration in optical characteristics such as coloration due to ultraviolet irradiation. Examples of preferable benzotriazoles include 2-(2H-benzotriazol-2-yl)-4-(1,1,3,3-tetramethylbutyl)phenol (manufactured by BASF SE; trade name: TINUVIN 329), 2-(2H-benzotriazol-2-yl)-4,6-bis(1-methyl-1-phenylethyl)phenol (manufactured by BASF SE; trade name: TINUVIN 234), 2,2'-methylenebis[6-(2H-benzotriazol-2-yl)-4-t-octylphenol](manufactured by ADEKA CORPORATION; LA-31), and 2-(5-octylthio-2H-benzotriazol-2-yl)-6-tert-butyl-4-methylphenol. These may be used singly or in combination of two or more thereof.

Examples of triazine ultraviolet absorbers include 2,4,6-tris(2-hydroxy-4-hexyloxy-3-methylphenyl)-1,3,5-triazine (manufactured by ADEKA CORPORATION; LA-F70) and its analogs such as hydroxyphenyltriazine ultraviolet absorbers (manufactured by BASF SE; TINUVIN 477 and TINUVIN 460) and 2,4-diphenyl-6-(2-hydroxy-4-hexyloxyphenyl)-1,3,5-triazine. These may be used singly or in combination of two or more thereof.

Examples of the age resistor include phenolic compounds such as hydroquinone, hydroquinone monomethyl ether, 2,5-di-t-butylphenol, 2,6-di(t-butyl)-4-methylphenol, and mono(or di or tri)(α-methylbenzyl)phenol; bisphenol compounds such as 2,2'-methylenebis(4-ethyl-6-t-butylphenol), 4,4'-butylidenebis(3-methyl-6-t-butylphenol), and 4,4'-thiobis(3-methyl-6-t-butylphenol); benzimidazole compounds such as 2-mercaptobenzimidazole and 2-mercaptomethylbenzimidazole; amine-ketone compounds such as 6-ethoxy-1,2-dihydro-2,2,4-trimethylquinoline, a reaction product of diphenylamine and acetone, and a 2,2,4-trimethyl-1,2-dihydroquinoline polymer; aromatic secondary amine compounds such as N-phenyl-1-naphthylamine, alkylated diphenylamine, octylated diphenylamine, 4,4'-bis(α,α-dimethylbenzyl)diphenylamine, p-(p-toluenesulfonylamido)diphenylamine, and N,N'-diphenyl-p-phenylenediamine; and thiourea compounds such as 1,3-bis(dimethylaminopropyl)-2-thiourea and tributylthiourea. These may be used singly or in combination of two or more thereof.

An antioxidant alone has an effect of preventing oxidation degradation of the resin in the presence of oxygen. Examples thereof include phosphorus antioxidants, hindered phenol antioxidants, and thioether antioxidants. These antioxidants may be used singly or in combination of two or more thereof. Among them, a phosphorus antioxidant and a hindered phenol antioxidant are preferable, and a combination of a phosphorus antioxidant and a hindered phenol antioxidant is more preferable, from the viewpoint of an effect of preventing deterioration of optical characteristics due to coloration.

In the case where the phosphorus antioxidant and the hindered phenol antioxidant are combined, the amount of the phosphorus antioxidant used: the amount of the hindered phenol antioxidant used is preferably 1:5 to 2:1, more preferably 1:2 to 1:1 in terms of mass ratio.

Examples of preferable phosphorus antioxidants include 2,2-methylenebis(4,6-di-t-butylphenyl)octyl phosphite (manufactured by ADEKA CORPORATION; trade name: ADK STAB HP-10), tris(2,4-di-t-butylphenyl) phosphite (manufactured by BASF SE; trade name: IRGAFOS 168), 3,9-bis(2,6-di-t-butyl-4-methylphenoxy)-2,4,8,10-tetraoxa-3,9-diphosphaspiro[5.5]undecane (manufactured by ADEKA CORPORATION; trade name: ADK STAB PEP-36). These may be used singly or in combination of two or more thereof.

Examples of preferable hindered phenol antioxidants include pentaerythrityl tetrakis[3-(3,5-di-t-butyl-4-hydroxyphenyl)propionate] (manufactured by BASF SE; trade name: IRGANOX 1010) and octadecyl 3-(3,5-di-t-butyl-4-hydroxyphenyl)propionate (manufactured by BASF SE; trade name: IRGANOX 1076). These may be used singly or in combination of two or more thereof.

The thermal degradation inhibitor can prevent thermal degradation of the resin by scavenging polymer radicals generated at the time of exposure to high heat in a substantially oxygen-free state. Examples of preferable thermal degradation inhibitors include 2-t-butyl-6-(3'-t-butyl-5'-methyl-hydroxybenzyl)-4-methylphenyl acrylate (manufactured by Sumitomo Chemical Co., Ltd.; trade name: Sumilizer GM) and 2,4-di-t-amyl-6-(3',5'-di-t-amyl-2'-hydroxy-α-methylbenzyl)phenyl acrylate (manufactured by Sumitomo Chemical Co., Ltd.; trade name: Sumilizer GS). These may be used singly or in combination of two or more thereof.

The light stabilizer is a compound that is said to have a function of scavenging radicals generated mainly by oxidation by light. Examples of suitable light stabilizers include hindered amines such as compounds having a 2,2,6,6-tetraalkylpiperidine skeleton. These may be used singly or in combination of two or more thereof.

Examples of the anti-stick agent include salts or esters of fatty acids, esters of polyhydric alcohols, inorganic salts, inorganic oxides, and particulate resins. Examples of preferable anti-stick agents include calcium stearate, calcium carbonate, calcium sulfate, magnesium sulfate, barium sulfate, silicon dioxide (manufactured by Evonik Industries AG.; AEROSIL), and a particulate acrylic resin. These may be used singly or in combination of two or more thereof.

Examples of the lubricant include stearic acid, behenic acid, stearamide acid, methylenebisstearamide, hydroxystearic acid triglyceride, paraffin wax, ketone wax, octyl alcohol, and hardened oil. These may be used singly or in combination of two or more thereof.

Examples of the release agent include higher alcohols such as cetyl alcohol and stearyl alcohol; and glycerol higher fatty acid esters such as stearic acid monoglyceride and stearic acid diglyceride. These may be used singly or in combination of two or more thereof.

As the polymer processing aid, polymer particles having a particle diameter of 0.05 to 0.5 μm, which can be produced by an emulsion polymerization method, are usually used. The polymer particles may be single layer particles formed of a polymer having a single composition ratio and a single limiting viscosity or may be multilayer particles formed of two or more polymers having different composition ratios or limiting viscosities. These may be used singly or in combination of two or more thereof. Among them, particles having a two-layer structure including a polymer layer having a low limiting viscosity as an inner layer and a polymer layer having a high limiting viscosity of 5 dl/g or more as an outer layer are preferable. The limiting viscosity of the polymeric processing aid is preferably 3 to 6 dl/g. When the limiting viscosity is too small, the effect of improving moldability tends to be low, and when the limiting viscosity is too large, formability of the copolymer tends to be deteriorated.

As an example of the organic dye, a compound having a function of converting ultraviolet light into visible light is preferably used. These organic dyes may be used singly or in combination of two or more thereof.

Examples of the phosphor include a fluorescent pigment, a fluorescent dye, a fluorescent white dye, a fluorescent brightener, and a fluorescent bleaching agent. These may be used singly or in combination of two or more thereof.

The resin composition of the present invention can be obtained by adding the additives during or after the production of the ionomer resin of the present invention. For example, the additives may be added to a polymerization or polymer reaction system in producing the ionomer resin, may be added in a step of separating the ionomer resin, or may be added after separation. In addition, the additives may be added at the time of producing a molded body such as a film.

The ionomer resin of the present invention and the resin composition of the present invention may be in the form of pellets or the like in order to improve convenience during storage, transportation, or formation. When the ionomer resin and the resin composition are pelletized, for example, a strand obtained by a melt extrusion method can be cut to provide the pellets. In the case of pelletization by a melt extrusion method, the temperature of the ionomer resin or the resin composition during melt extrusion is preferably 150° C. or higher, more preferably 170° C. or higher, from the viewpoint of ease of stabilizing discharge from the extruder. The temperature is preferably 250° C. or lower, more preferably 230° C. or lower, from the viewpoint of suppression of degradation of the resin due to thermal decomposition. Since the ionomer resin of the present invention and the resin composition of the present invention have high thermal decomposition resistance, problems such as generation of black foreign matter due to thermal decomposition of the ionomer resin at the time of pelletization by a melt extrusion method as described above are less likely to occur. In addition, since the ionomer resin of the present invention and the resin composition of the present invention have less odor, health of workers can be secured.

[Resin Sheet]

The present invention includes a resin sheet comprising the ionomer resin of the present invention or the resin composition of the present invention. The resin sheet of the present invention comprises the ionomer resin of the present invention or the resin composition of the present invention and can be excellent in transparency and self-supporting ability under a high-temperature environment, have a low colorability, have sufficient adhesiveness to glass even when bonded to glass at a lower temperature than that in a conventional case, and maintain high strength even after a long period of time. Therefore, the resin sheet can be suitably used as an interlayer film for laminated glass.

The resin sheet of the present invention is excellent in low-temperature adhesiveness. The low-temperature adhesiveness can be evaluated by producing laminated glass at a relatively low temperature (such as about 130° C.) as a temperature at the time of producing the laminated glass, such as a temperature in a pressure bonding step to be described later, and measuring the maximum shear stress of the obtained laminated glass. In one embodiment of the present invention, the maximum shear stress of laminated glass comprising the resin sheet of the present invention as an interlayer film for laminated glass is preferably 25 MPa or more, more preferably 26 MPa or more, still more preferably 27 MPa or more, particularly preferably 28 MPa or more. When the maximum shear stress is equal to or more than the above lower limit, excellent low-temperature adhesiveness can be exhibited. The upper limit of the maximum shear stress is usually 60 MPa or less, preferably 55 MPa or less, more preferably 50 MPa or less, still more preferably 45 MPa or less, particularly preferably 40 MPa or less. The maximum shear stress can be measured by, for example, a method described in the EXAMPLES section.

The resin sheet of the present invention has excellent strength even after a long period of time. The strength after a long period of time can be evaluated using a relaxation modulus (long-time relaxation modulus) after a long period of time, such as a relaxation modulus after $2.6\times10^6$ seconds (after about 1 month) when a master curve is prepared at 50° C. In one embodiment of the present invention, the relaxation modulus after $2.6\times10^6$ seconds (after about 1 month) when a master curve is prepared at 50° C. is preferably 0.25 MPa or more, more preferably 0.27 MPa or more, still more preferably 0.29 MPa or more, particularly preferably 0.32 MPa or more, most preferably 0.35 MPa or more. When the relaxation modulus is equal to or more than the above lower limit, the resin sheet and the laminated glass comprising the resin sheet as an interlayer film can exhibit excellent strength after a long period of time. The upper limit of the relaxation modulus is usually 5.0 MPa or less, preferably 4.0 MPa or less, more preferably 3.0 MPa or less, still more preferably 2.0 MPa or less, from the viewpoint of handleability of the resin sheet. The relaxation modulus can be determined from a master curve at a reference temperature of 50° C. obtained from dynamic viscoelasticity measurement and the time-temperature conversion rule using a dynamic viscoelasticity measuring device after the resin sheet is left standing in an atmosphere at 23° C. and 50% RH for 1 week or more, and the relaxation modulus can be determined, for example, by a method described in the EXAMPLES section.

The resin sheet of the present invention is excellent in self-supporting ability under a high-temperature environment. The self-supporting ability under a high-temperature environment can be evaluated using a storage modulus at 50° C. In one embodiment of the present invention, the storage modulus of the resin sheet of the present invention at 50° C. is preferably 30 MPa or more, more preferably 35 MPa or more, still more preferably 40 MPa or more, still more preferably 45 MPa or more, particularly preferably 50 MPa or more, more particularly preferably 55 MPa or more. When the storage modulus at 50° C. is equal to or more than the above lower limit, the resin sheet can exhibit excellent self-supporting ability under a high-temperature environment (such as about 50° C.). The upper limit of the storage modulus at 50° C. is preferably 300 MPa or less, more preferably 250 MPa or less, still more preferably 200 MPa or less, still more preferably 150 MPa or less. The storage modulus at 50° C. can be measured using a dynamic viscoelasticity measuring device and, for example, can be measured by a method described in the EXAMPLES section.

The resin sheet of the present invention has a low colorability and is preferably colorless. The yellowness index (YI) of the resin sheet of the present invention is preferably 2.0 or less, more preferably 1.8 or less, still more preferably 1.5 or less, still more preferably 1.3 or less, particularly preferably 1.0 or less. When the yellowness index (YI) is equal to or less than the above upper limit, the resin sheet and the laminated glass comprising the resin sheet as an interlayer film can exhibit a low colorability. The lower limit of the yellowness index (YI) is 0 or more. The yellowness index (YI) can be measured in accordance with JIS K 7373 based on a value measured in accordance with JIS Z 8722 using a color and color difference meter and can be calculated, for example, by a method described in the EXAMPLES section.

The resin sheet of the present invention is excellent in the transparency of the sheet itself in a flat surface state in which the surface has no melt fracture or is not embossed and is also excellent in the transparency in the form of laminated glass formed using the resin sheet as an interlayer film. The transparency of the laminated glass having the resin sheet of the present invention as an interlayer film can be evaluated, for example, using the haze (referred to as slow cooling haze) obtained when the laminated glass is heated to 140° C. and then slowly cooled to 23° C. at a rate of 0.1° C./min. The slow cooling haze is a haze in a state in which crystallization of the ionomer resin is promoted by the slow cooling. The slow cooling haze of the laminated glass having the resin sheet of the present invention as an interlayer film is preferably 5.0% or less, more preferably 4.5% or less, still more preferably 4.0% or less, still more preferably 3.5% or less, particularly preferably 3.0% or less. Since the transparency of the ionomer resin increases as the haze decreases, the lower limit is not particularly limited but may be, for example, 0.01% or more. The slow cooling haze is determined by producing laminated glass having the resin sheet as an interlayer film, heating the laminated glass to 140° C., then slowly cooling the laminated glass from 140° C. to 23° C. at a rate of 0.1° C./min, and measuring the haze with a haze meter in accordance with JIS K 7136: 2000, and the slow cooling haze is determined, for example, by a method described in the EXAMPLES section.

In one embodiment of the present invention, the resin sheet of the present invention preferably has a low water content from the viewpoint of adhesiveness to glass. The water content is preferably 1 mass % or less, more preferably 0.5 mass % or less, still more preferably 0.02 mass % or less, particularly preferably 0.01 mass % or less with respect to the mass of the resin sheet.

In one embodiment of the present invention, the content of the ionomer resin contained in the resin sheet of the present invention is preferably 90 mass % or more, more preferably 93 mass % or more, still more preferably 95 mass % or more, still more preferably 98 mass % or more, and is preferably 100 mass % or less with respect to the mass of the resin sheet from the viewpoint of ease of enhancing the transparency, the self-supporting ability under a high-temperature environment, the strength after a long period of time, and the low-temperature adhesiveness of the resulting resin sheet and ease of reducing the colorability.

In one embodiment of the present invention, the thickness of the resin sheet of the present invention is preferably 0.1 mm or more, more preferably 0.2 mm or more, still more preferably 0.3 mm or more, still more preferably 0.4 mm or more, particularly preferably 0.5 mm or more, more particularly preferably 0.6 mm or more, most preferably 0.7 mm or more, and is preferably 5 mm or less, more preferably 4 mm or less, still more preferably 3 mm or less, still more preferably 1.5 mm or less, particularly preferably 1.2 mm or less, more particularly preferably 1 mm or less. When the thickness of the resin sheet is equal to or more than the above lower limit, the low-temperature adhesiveness and the strength after a long period of time of the resin sheet can be enhanced, and when the thickness of the resin sheet is equal to or less than the above upper limit, the transparency of the resin sheet can be enhanced, and the colorability can be reduced. The thickness of the resin sheet can be measured using, for example, a contact or non-contact thickness gauge and can be measured by, for example, a method described in the EXAMPLES section. In the case where the resin sheet is a laminate, the thickness of the resin sheet indicates the thickness of one layer (x).

The resin sheet of the present invention may be composed of only a layer (referred to as the layer (x)) comprising the ionomer resin or the resin composition or may be a laminate comprising at least one layer (x). The laminate is not particularly limited, and examples thereof include a laminate comprising another layer in addition to the layer (x), such as a two-layered body in which the layer (x) and another layer are laminated, and a laminate in which another layer is disposed between two layers (x). In addition, the resin sheet may be wound in a roll shape or may be in a sheet state.

Examples of the other layer include a layer comprising a publicly-known resin. Examples of the resin include polyethylene, polypropylene, polyvinyl chloride, polystyrene, polyurethane, polytetrafluoroethylene, acrylic resins, polyamides, polyacetals, polycarbonates, polyethylene terephthalate and polybutylene terephthalate among polyesters, cyclic polyolefins, polyphenylene sulfide, polytetrafluoroethylene, polysulfones, polyethersulfone, polyarylates, liquid crystal polymers, polyimides, and thermoplastic elastomers. In addition, the other layer may also comprise additives such as a plasticizer, an antioxidant, an ultraviolet absorber, a light stabilizer, an antiblocking agent, a pigment, a dye, a heat shielding material (such as inorganic heat shielding fine particles and organic heat shielding materials having infrared ray absorbing ability), and a functional inorganic compound, as necessary.

The resin sheet of the present invention can be obtained by kneading, preferably uniformly melt-kneading, the ionomer resin or the resin composition and then forming the layer (x) by a publicly-known film forming method such as an extrusion method, a calendering method, a compression molding method, a pressing method, a solution casting method, a melt casting method, and an inflation method. In the case where the resin sheet is a laminate, the layer (x) and the other layer may be laminated by press molding or the like to form a laminated resin sheet, or the layer (x) and the other layer may be molded by a co-extrusion method to form a laminated resin sheet. The additives may be added during kneading, preferably melt-kneading, of the ionomer resin or the resin composition.

Among publicly-known film forming methods, a method for producing a resin sheet using a compression molding method or an extrusion method is particularly preferably used. The resin temperature during compression molding or extrusion is preferably 150° C. or higher, more preferably 170° C. or higher, and is preferably 250° C. or lower, more preferably 230° C. or lower. When the resin temperature is equal to or lower than the above upper limit, decomposition and deterioration of the resin can be suppressed. Conversely, when the resin temperature is equal to or more than the above lower limit, the moldability of the resin can be improved. In addition, for example, in the case of using an extruder, in order to efficiently remove a volatile substance, it is preferable to remove the volatile substance from a vent port of the extruder by decompression. By using the ionomer resin of the present invention, a film can be formed without deteriorating the working environment during film formation.

An irregular structure may be formed on the surface of the resin sheet of the present invention by a conventionally- and publicly-known method such as a melt fracture method and embossing. As the shapes of the melt fracture and embossment, conventionally- and publicly-known shapes can be adopted. Forming an irregular structure on the surface of the resin sheet of the present invention is preferable from the viewpoint of excellent bubble-removing properties when the resin sheet and a base material such as glass are thermocompression-bonded.

[Laminated Glass]

The present invention includes laminated glass comprising two glass plates and an interlayer film disposed between the two glass plates, wherein the interlayer film is the resin sheet of the present invention. Since the laminated glass of the present invention comprises the resin sheet of the present invention as an interlayer film, the laminated glass is excellent in transparency and self-supporting ability under a high-temperature environment, has a low colorability, has sufficient adhesiveness even when glass and the resin sheet (interlayer film) are bonded to each other at a temperature lower than that in a conventional case in a production process, and can maintain high strength even after a long period of time.

As the glass plate to be laminated with the resin sheet of the present invention, for example, in addition to inorganic glass such as float plate glass, tempered glass, polished plate glass, figured glass, wire glass, and heat absorbing glass, conventionally- and publicly-known organic glass such as polymethyl methacrylate and a polycarbonate and the like can be used. These may be colorless or colored. These may be used singly or in combination of two or more thereof. The thickness of the glass is preferably 100 mm or less.

The laminated glass formed by sandwiching the resin sheet of the present invention between two plates of glass can be produced by a conventionally- and publicly-known method. Examples of the method include a method using a vacuum laminator, a method using a vacuum bag, a method using a vacuum ring, and a method using nip rolls. Examples also include a method in which temporary compression bonding is performed by the above method, and then the product is put in an autoclave to perform main bonding.

In the case of using a vacuum laminator, for example, the glass plates, the resin sheet (interlayer film), and optionally an adhesive resin layer, an organic glass plate, or the like may be laminated under a reduced pressure of $1\times10^{-6}$ to $1\times10^{-1}$ MPa at 60 to 200° C., particularly 80 to 160° C. A method using a vacuum bag or a vacuum ring is described, for example, in EP-B-1 235 683, and the lamination may be performed at 100 to 160° C. under a pressure of about $2\times10^{-2}$ to $3\times10^{-2}$ MPa.

Examples of the production method using nip rolls include a method in which deaeration is performed with rolls at a temperature equal to or lower than the flow starting temperature of the resin sheet (interlayer film), and then compression bonding is performed at a temperature close to the flow starting temperature. Specifically, for example, there is a method of heating to 30 to 70° C. with an infrared heater or the like, then performing deaeration with rolls, further heating to 50 to 120° C., and then performing compression bonding with rolls.

In the case where compression bonding is further performed in an autoclave after compression bonding is performed by the above-described method, the operating conditions of the autoclaving step are appropriately selected depending on the thickness and configuration of the laminated glass, but for example, it is preferable to perform treatment at 100 to 160° C. for 0.5 to 3 hours under a pressure of 0.5 to 1.5 MPa. In the present specification, the step of pre-bonding with a vacuum laminator or the like and the step of main bonding with an autoclave or the like may be referred to as a thermocompression bonding step. Since the laminated glass of the present invention is formed of a resin sheet comprising the ionomer resin containing 2.6 mass % or more of the low-molecular-weight component or the resin composition containing the ionomer resin, the adhesiveness between glass and the resin sheet is excellent even when the compression bonding temperature in the thermocompression bonding step such as the main bonding is relatively low (for example, even at about 130° C.). The maximum shear stress as an index of the low-temperature adhesiveness of the laminated glass of the present invention is the same as the maximum shear stress of the laminated glass described in the section of [Resin Sheet].

In addition, since the laminated glass of the present invention is formed of the resin sheet comprising the ionomer resin having a predetermined number average molecular weight and containing 4.0 mass % or less of the low-molecular-weight component or the resin composition containing the ionomer resin and having a high long-time relaxation modulus, excellent strength can be maintained even after a long period of time (such as about 1 month).

The laminated glass of the present invention has excellent transparency, and in particular, the laminated glass has a low haze (slow cooling haze) when heated to 140° C. and then slowly cooled to 23° C. at a rate of 0.1° C./min. The slow cooling haze is a haze in a state in which crystallization of the ionomer resin is promoted by the slow cooling. The slow cooling haze of the laminated glass of the present invention is preferably 5.0% or less, more preferably 4.5% or less, still more preferably 4.0% or less, still more preferably 3.5% or less, particularly preferably 3.0% or less. Since the transparency of the ionomer resin increases as the haze decreases, the lower limit is not particularly limited but may be, for example, 0.01% or more. The slow cooling haze is determined by heating the laminated glass to 140° C., then slowly cooling the laminated glass from 140° C. to 23° C. at a rate of 0.1° C./min, and measuring the haze with a haze meter in accordance with JIS K 7136: 2000, and the slow cooling haze can be measured, for example, by a method described in the EXAMPLES section.

The laminated glass of the present invention is less colored and is preferably colorless. The yellowness index (YI) of the laminated glass of the present invention can be selected from the same range as the yellowness index (YI) of the resin sheet described in the section of [Resin Sheet].

As described above, the resin sheet comprising the ionomer resin of the present invention and the resin composition containing the ionomer resin of the present invention is useful as an interlayer film for laminated glass. The interlayer film for laminated glass is particularly preferable as an interlayer film for laminated glass for a structural material from the viewpoint of excellent adhesiveness to a base material such as glass, the transparency, self-supporting ability, and strength. Further, the interlayer film is not limited to the interlayer film of laminated glass for structural materials but is also suitable as an interlayer film for laminated glass in various applications such as automobile windshields, automobile side glass, automobile sunroofs, automobile rear glass, glass for head-up displays, other mobile bodies such as automobiles, laminates for outer walls and roofs, structures such as panels, doors, windows, walls, roofs, sunroofs, sound insulation walls, display windows, balconies, and parapets, partition glass members for rooms, and solar cells but is not limited to these applications.

EXAMPLES

The present invention will be specifically described below with reference to examples and comparative examples, but the present invention is not limited to the following examples.

Analysis of Ionomer Resins Obtained in Examples and Comparative Examples

The contents of the carboxylic acid ester unit (A), the carboxylic acid unit (B), and the neutralized carboxylic acid unit (C) were analyzed as follows.

Ionomer resins obtained in the examples and the comparative examples were each dissolved in a mixed solvent of dehydrated toluene/dehydrated acetic acid (75/25 mass %), allowed to react at 100° C. for 2 hours, and then reprecipitated in a mixed solvent of acetone/water (80/20 mass %) to convert the neutralized carboxylic acid unit (C) into the carboxylic acid unit (B). The obtained resin was sufficiently washed with water and then dried, and the dried resin was subjected to the following (1) to (3).

(1) The components of the monomer units constituting the resin were analyzed by pyrolysis GC-MS.

(2) The acid value of the resin was measured according to JIS K 0070-1992.

(3) $^{1}$H-NMR (400 MHz, manufactured by JEOL Ltd.) measurement of the resin was performed using a mixed solvent of deuterated toluene and deuterated methanol.

(4) Each of the ionomer resins obtained in the examples and the comparative examples was subjected to a microwave digestion pretreatment with nitric acid, and then the type and amount of metal ions in the neutralized carboxylic acid unit (C) were identified by ICP emission spectrometry ("iCAP 6500 Duo" manufactured by Thermo Fisher Scientific Inc.).

From the above (1), the types and structures of the carboxylic acid ester unit (A) and the carboxylic acid unit (B) were identified. Based on that information, the ratio of ethylene unit (D)/carboxylic acid ester unit (A)/(total of carboxylic acid unit (B) and neutralized carboxylic acid unit (C)) was calculated from the information of (2) and (3). Furthermore, the ratio of ethylene unit (D)/carboxylic acid ester unit (A)/carboxylic acid unit (B)/neutralized carboxylic acid unit (C) was calculated from the information of (4).

[Melt Flow Rate (MFR)]

The MFRs of the ethylene-carboxylic acid ester copolymers (X) used in the examples and the comparative examples and the ionomer resins obtained in the examples and the comparative examples were measured in accordance with JIS K 7210. Specifically, each copolymer or each resin was melted in a cylinder and extruded from a die having a specified diameter (2.095 mm) installed at the bottom of the cylinder under a loading condition of 190° C. and 2.16 kg, the amount of the resin extruded per 1 minute (g/min) was measured, and the MFR was determined by converting the amount into the amount of the resin extruded per 10 minutes (g/10 min).

[Number Average Molecular Weight, Molecular Weight Distribution, and Content of Low-Molecular-Weight Component]

The molecular weights of the ionomer resins obtained in the examples and the comparative examples were measured as follows.

The ionomer resins obtained in the examples and the comparative examples were each heated and dissolved in a mixed solvent of acetic acid/toluene to convert the neutralized carboxylic acid unit into the carboxylic acid unit. Further, the carboxylic acid unit was esterified with trimethylsilyldiazomethane to form methyl carboxylate. The ionomer resin obtained by converting the neutralized carboxylic acid unit and the carboxylic acid unit into the methyl carboxylate unit in this manner was dissolved by heating in 1,2,4-trichlorobenzene to which 0.1% of dibutylhydroxytoluene (BHT) had been added and then subjected to hot filtration through a 0.5-μm sintered filter. The chromatogram of the obtained ionomer resin was measured by GPC under the following conditions, and the number average molecular weight (Mn) in terms of polyethylene and the molecular weight distribution were calculated. The molecular weight in terms of polyethylene is a value obtained by converting a molecular weight in terms of standard polystyrene into a molecular weight in terms of polyethylene using the Q factor. Note that the baseline was a line connecting a point at which the slope of a peak on the high molecular weight side of the GPC chart changed from zero to plus as viewed from the earlier side of the retention time and a point at which the slope of a peak on the low molecular weight side changed from minus to zero as viewed from the earlier side of the retention time.

In addition, the ratio of the low-molecular-weight component having a molecular weight of 2,500 or less was calculated from the integral molecular weight distribution calculated using the calibration curve.

GPC apparatus: HLC-8320 manufactured by Tosoh Corporation

Detector: Differential refractive index detector

Column: One TSKgel Guard Column HHR (30) (7.5 mm I. D.×7.5 cm) and three TSKgel $GMH_{HR}$-H (20) HT (7.8 mm T. D.×30 cm) manufactured by Tosoh Corporation connected in series were used.

Eluent: 1,2,4-Trichlorobenzene+BHT (0.05%)

Eluent flow rate: 1.0 ml/min

Sample injection amount: 0.3 ml

Column temperature: 140° C.

Calibration curve: Prepared using data of 10 points of standard polystyrene

Q factor: 41.3 for polystyrene and 17.7 for polyethylene

[Self-Supporting Ability Under High-Temperature Environment]

A test piece having a length of 40 mm×a width of 5 mm was cut out from each of resin sheets obtained in the examples and the comparative examples, the storage modulus (E') was measured under the conditions of a measurement temperature of 50° C., a frequency of 1 Hz, and a heating rate of 3° C./min using a dynamic viscoelasticity measuring device manufactured by UBM Co., Ltd., and the value was used as an index of the self-supporting ability of the resin sheet under a high-temperature environment. The higher the storage modulus at 50° C. is, the higher the self-supporting ability of the resin sheet under a high-temperature environment is. In the evaluation of self-supporting ability under a high-temperature environment, the case where the storage modulus was 30 MPa or more was rated as "A", and the case where the storage modulus was less than 30 MPa was rated as "B".

[Strength after Long Period of Time]

The resin sheets obtained in the examples and the comparative examples were each left standing in an atmosphere at 23° C. and 50% RH for 1 week or more, and then a test piece having a length of 40 mm×a width of 5 mm was cut out. Using a dynamic viscoelasticity measuring device manufactured by UBM Co., Ltd., a long-time relaxation modulus was determined from a master curve at a reference temperature of 50° C. obtained from dynamic viscoelasticity measurement and the time-temperature conversion rule, and the value was used as an index of the strength of the resin sheet after a long period of time. The higher the long-time relaxation modulus is, the higher the strength of the resin sheet after a long period of time is. In the evaluation of the strength of the resin sheet after a long period of time, the case where the long-time relaxation modulus was 0.25 MPa or more was rated as "A", and the case where the long-time relaxation modulus was less than 0.25 MPa was rated as "B".

In the dynamic viscoelasticity measurement, tensile measurement was performed under the conditions of temperatures of 50 to 100° C. and frequencies of 0.1, 0.5, 1, 5, 10, 50, and 100 Hz by a method in accordance with JIS K 0129: 2005. From the measurement result of the storage modulus obtained, a master curve was prepared with a reference temperature of 50° C. using the temperature-time conversion rule, a storage modulus (E' (t1)) at a frequency of $4.0\times10^{-7}$ Hz and a loss modulus (E" (t2)) at a frequency of $2.0\times10^{-7}$ Hz were read, and a relaxation modulus G(t) at 50° C. after $2.6\times10^{6}$ seconds was determined by equation (A) below with the Poisson's ratio being fixed to 0.5.

$$G(t)=E'(t1)/3-0.4\times E''(t2)/3 \quad (A)$$

A series of these calculations was performed using calculation software "Rheo Station" (UBM Co., Ltd.) included with a dynamic viscoelasticity measuring device manufactured by UBM Co., Ltd.

[Low-Temperature Adhesiveness to Glass]

The resin sheets obtained in the examples and the comparative examples were each sandwiched between two plates of float glass having a thickness of 2.7 mm, using a vacuum laminator (1522N manufactured by Nisshinbo Mechatronics Inc.), the pressure inside the vacuum laminator was reduced at 100° C. for 1 minute, and pressing was performed at 30 kPa for 5 minutes while maintaining the degree of decompression and the temperature to provide a temporarily bonded product. The resulting temporarily bonded product was charged into an autoclave and treated at 130° C. and 1.2 MPa for 30 minutes to provide laminated glass.

Then, the resulting laminated glass was cut into a size of 25 mm×mm to provide a test sample. The resulting test sample was evaluated by a compression shear strength test described in WO-A-1999/058334. The maximum shear stress when the laminated glass was delaminated was used as an index of the low-temperature adhesiveness to glass. The higher the maximum shear stress is, the higher the low-temperature adhesiveness to glass is. In the evaluation of the low-temperature adhesiveness to glass, the case where the maximum shear stress was 25 MPa or more was rated as "A", and the case where the maximum shear stress was less than 25 MPa was rated as "B".

[Colorability]

The resin sheets obtained in the examples and the comparative examples were measured in accordance with JIS Z 8722 using a color and color difference meter "ZE-2000" (trade name) manufactured by Nippon Denshoku Industries Co., Ltd. A yellowness index value calculated in accordance with JIS K 7373 based on the obtained value was defined as a yellow index (YI). The lower the YI is, the lower the colorability of the resin sheet is. In the evaluation of the colorability, the case where the measured YI was 2.0 or less was rated as "A", and the case where the measured YI was more than 2.0 was rated as "B".

[Transparency after Slow Cooling (Slow Cooling Haze)]

The resin sheets obtained in the examples and the comparative examples were each sandwiched between two plates of float glass (manufactured by Nippon Sheet Glass Company, Ltd.) having a thickness of 2.7 mm, using a vacuum laminator (1522N manufactured by Nisshinbo Mechatronics Inc.), the pressure inside the vacuum laminator was reduced at 100° C. for 1 minute, and pressing was performed at 30 kPa for 5 minutes while maintaining the degree of decompression and the temperature to provide a temporarily bonded product. The resulting temporarily bonded product was charged into an autoclave and treated at 140° C. and 1.2 MPa for 30 minutes to provide laminated glass.

The resulting laminated glass was heated to 140° C. and then slowly cooled to 23° C. at a rate of 0.1° C./min. The haze of the laminated glass after the slow cooling operation was measured in accordance with JIS K 7136: 2000 using a haze meter HZ-1 (manufactured by Suga Test Instruments Co., Ltd.). The lower the slow cooling haze is, the higher the transparency when the laminated glass is slowly cooled is. In the evaluation of the transparency after slow cooling, the case where the measured haze was 5.0% or less was rated as "A", the case where the haze was more than 5.0% and 10% or less was rated as "B", and the case where the haze was more than 10% was rated as "C".

[Thickness of Resin Sheet]

The thicknesses of the resin sheets obtained in the examples and the comparative examples were measured using a digital microgauge.

[Raw Material Resin]

The methyl methacrylate (MMA) modification amount or the ethyl acrylate (EA) modification amount and the MFR of each of ethylene-(meth)acrylic acid ester copolymers (X) used as raw materials of the ionomer resins in the examples and the comparative examples are shown in Table 1. These ethylene-(meth)acrylic acid ester copolymers (X) can be synthesized by a high-temperature and high-pressure radical polymerization method described in US-A-2013/0,274,424, JP-A-2006-233059, or JP-A-2007-84743. For example, "Acryft" (registered trademark) manufactured by Sumitomo Chemical Co., Ltd. can be used as EMMA, and "Rexpearl" (registered trademark) manufactured by Japan Polyethylene Corporation can be used as EEA.

TABLE 1

| | Modification amount | | MFR |
|---|---|---|---|
| | mass % | mol % | g/10 min |
| EMMA1 | 18 | 5.8 | 7 |
| EMMA2 | 24 | 8.1 | 100 |
| EMMA3 | 25 | 8.5 | 150 |
| EMMA4 | 25 | 8.5 | 7 |
| EMMA5 | 28 | 9.8 | 450 |
| EEA | 25 | 8.5 | 200 |
| EMA | 24 | 9.3 | 330 |

EMMA: Copolymer of ethylene and methyl methacrylate
EEA: Copolymer of ethylene and ethyl acrylate
EMA: Copolymer of ethylene and methyl acrylate
Modification amount: Content of (meth)acrylic acid ester unit based on total of monomer units constituting resin

Example 1

(Ionomer Resin)

Into a reaction tank, 100 parts by mass of EMMA2 in Table 1 was introduced, 233 parts by mass of toluene was added thereto, and the mixture was stirred at 60° C. under a pressure of 0.02 MPa to dissolve EMMA2. To the resulting solution, 96 parts by mass of a methanol solution (20 mass %) of sodium hydroxide was added, and the mixture was stirred at 100° C. for 4 hours to saponify EMMA2 to convert a part of the methyl methacrylate unit into a sodium methacrylate unit. Subsequently, this solution was cooled to 50° C., then 79 parts by mass of hydrochloric acid (20 mass %) was added to the reaction liquid, and the mixture was stirred at ° C. for 1 hour to convert a part of the sodium methacrylate unit into methacrylic acid, thereby providing a crude ionomer resin solution.

A mixed solvent of toluene/methanol (75/25 mass %) was added to the obtained crude ionomer resin solution such that the crude ionomer resin concentration was 10 mass %, and the solution was diluted. Subsequently, the resulting diluted solution of the crude ionomer resin was adjusted to 34° C., and then methanol at 34° C. was added to the diluted solution in an amount of 430 parts by mass with respect to 100 parts by mass of the crude ionomer resin solution to precipitate a granular resin. Next, the obtained granular resin was collected by filtration, and then 100 parts by mass of the collected granular resin and 600 parts by mass of a mixed solvent of water/methanol (50/50 mass %) were mixed. The slurry obtained by the mixing was stirred at 40° C. for 1 hour, and then the granular resin was collected by filtration at room temperature. The granular resin was further washed with a mixed solvent of water/methanol three times to provide a washed granular ionomer resin. The obtained granular ionomer resin was vacuum-dried for 8 hours or more and then melt-kneaded at 210° C. and a rotation rate of 90 rpm for 3 minutes using a batch-type melt-kneader to provide an ionomer resin.

(Resin Sheet)

The resulting melt-kneaded product of the ionomer resin was subjected to compression molding at a pressure of 50 $kgf/cm^2$ for 5 minutes under heating at 210° C. to provide a resin sheet having a thickness of 0.8 mm.

Example 2

An ionomer resin and a resin sheet were obtained in the same manner as in Example 1 except that EMMA3 in Table 1 was used and that 100 parts by mass of a methanol solution of sodium hydroxide and 83 parts by mass of hydrochloric acid (20 mass %) were added.

Example 3

An ionomer resin and a resin sheet were obtained in the same manner as in Example 1 except that EMMA3 in Table 1 was used, that 100 parts by mass of a methanol solution of sodium hydroxide and 83 parts by mass of hydrochloric acid (20 mass %) were added, and that the saponification reaction time was changed to 2 hours.

Example 4

An ionomer resin and a resin sheet were obtained in the same manner as in Example 1 except that 70 parts by mass of EMMA4 and 30 parts by mass of EMMA5 in Table 1 were used and that 104 parts by mass of a methanol solution of sodium hydroxide and 83 parts by mass of hydrochloric acid (20 mass %) were added.

Example 5

An ionomer resin and a resin sheet were obtained in the same manner as in Example 1 except that EEA in Table 1 was used and that 78 parts by mass of hydrochloric acid (20 mass %) was added.

Example 6

An ionomer resin and a resin sheet were obtained in the same manner as in Example 1 except that EMA in Table 1 was used and that 111 parts by mass of a methanol solution of sodium hydroxide and 91 parts by mass of hydrochloric acid (20 mass %) were added.

Comparative Example 1

An ionomer resin and a resin sheet were obtained in the same manner as in Example 1 except that EMMA1 in Table 1 was used and that 72 parts by mass of a methanol solution of sodium hydroxide and 58 parts by mass of hydrochloric acid (20 mass %) were added.

Comparative Example 2

An ionomer resin and a resin sheet were obtained in the same manner as in Example 1 except that 90 parts by mass of hydrochloric acid (20 mass %) was added.

Comparative Example 3

An ionomer resin and a resin sheet were obtained in the same manner as in Example 1 except that EMMA4 in Table 1 was used and that 100 parts by mass of a methanol solution of sodium hydroxide and 83 parts by mass of hydrochloric acid (20 mass %) were added.

Comparative Example 4

An ionomer resin and a resin sheet were obtained in the same manner as in Example 1 except that EMMA3 in Table 1 was used, that 100 parts by mass of a methanol solution of sodium hydroxide and 83 parts by mass of hydrochloric acid (20 mass %) were added, and that the saponification reaction temperature was changed to 80° C.

Comparative Example 5

An ionomer resin and a resin sheet were obtained in the same manner as in Example 1 except that EMMA5 in Table 1 was used and that 112 parts by mass of a methanol solution of sodium hydroxide and 84 parts by mass of hydrochloric acid (20 mass %) were added.

Comparative Example 6

Referring to the method described in U.S. Pat. No. 6,518,365, ethylene and methacrylic acid were copolymerized to provide an ethylene-(meth)acrylic acid copolymer, and then the copolymer was partially neutralized with sodium hydroxide to provide an ionomer resin, which may be referred to as Ionomer 1, having a composition in Table 2. Using the obtained ionomer resin, a resin sheet was obtained in the same manner as in Example 1.

Comparative Example 7

Referring to the method described in U.S. Pat. No. 6,518,365, ethylene, methacrylic acid, and t-butyl acrylate were copolymerized to provide an ethylene-(meth)acrylic acid-t-butyl acrylate copolymer, and then the copolymer was partially neutralized with sodium hydroxide to provide an ionomer resin, which may be referred to as Ionomer 2, having a composition in Table 2. Using the obtained ionomer resin, a resin sheet was obtained in the same manner as in Example 1.

The self-supporting ability under a high-temperature environment, the strength after a long period of time, the colorability, and the adhesiveness to glass of the resin sheets obtained in the examples and the comparative examples and the transparency of laminated glass after slow cooling were evaluated according to the above methods, and the results are shown in Table 2. In Table 2, values obtained by measuring the storage modulus at 50° C., the long-time relaxation modulus, the yellowness index (YI), the maximum shear stress, and the slow cooling haze are shown in parentheses.

The ionomer resins used in the examples and the comparative examples were analyzed according to the above method, and the results thereof are also shown in Table 2. In Table 2, the content of the carboxylic acid ester unit (A) [(meth)acrylic acid ester unit] is denoted as ester (A), the content of the carboxylic acid unit (B) [(meth)acrylic acid unit] is denoted as acid (B), the content of the neutralized carboxylic acid unit (C) [neutralized (meth)acrylic acid unit] is denoted as neutralized product (C), and the total content of the carboxylic acid ester unit (A), the carboxylic acid unit (B), and the neutralized carboxylic acid unit (C) is denoted as (A)+(B)+(C). Note that each content is based on the total of monomer units constituting the ionomer resin.

TABLE 2

| | Raw material resin | Ionomer resin Ester (A) mol % | Acid (B) mol % | Neutralized product (C) mol % | (A) + (B) + (C) mol % | MFR g/10 min | Mn g/mol | Low-molecular-weight component % |
|---|---|---|---|---|---|---|---|---|
| Example 1 | EMMA2 | 0.1 | 6.5 | 1.6 | 8.1 | 1.0 | 10,000 | 3.4 |
| Example 2 | EMMA3 | 0.1 | 6.7 | 1.7 | 8.5 | 1.4 | 9,700 | 3.8 |
| Example 3 | EMMA3 | 0.8 | 6.2 | 1.5 | 8.5 | 1.5 | 9,700 | 3.8 |
| Example 4 | EMMA4 + EMMA5 | 0.1 | 6.6 | 2.2 | 8.9 | 0.5 | 12,800 | 2.7 |
| Example 5 | EEA | 0.1 | 5.9 | 2.5 | 8.5 | 1.2 | 12,000 | 2.7 |
| Example 6 | EMA | 0.1 | 7.3 | 1.9 | 9.3 | 3.1 | 8,200 | 3.9 |
| Comparative Example 1 | EMMA1 | 0.1 | 4.5 | 1.3 | 5.8 | 0.2 | 15,000 | 2.2 |
| Comparative Example 2 | EMMA2 | 0.1 | 8.0 | 0.0 | 8.1 | 19 | 10,000 | 3.4 |
| Comparative Example 3 | EMMA4 | 0.1 | 6.8 | 1.6 | 8.5 | 0.1 | 15,000 | 2.0 |
| Comparative Example 4 | EMMA3 | 2.0 | 5.2 | 1.3 | 8.5 | 1.9 | 9,700 | 3.8 |
| Comparative Example 5 | EMMA5 | 0.1 | 6.2 | 3.5 | 9.8 | 13 | 7,800 | 4.2 |
| Comparative Example 6 | Ionomer 1 | 0 | 6.3 | 1.8 | 8.1 | 2.7 | 11,000 | 2.5 |
| Comparative Example 7 | Ionomer 2 | 3.0 | 6.0 | 2.1 | 11.1 | 3.5 | 12,000 | 2.2 |

| | Self-supporting ability under high-temperature environment Elastic modulus at 50° C. MPa | Strength after long period of time Long-time relaxation modulus MPa | Low-temperature adhesiveness to glass Maximum shear stress MPa | Transparency after slow cooling Slow cooling haze % | Colorability Yellowness index |
|---|---|---|---|---|---|
| Example 1 | A (60) | A (0.37) | A (26) | A (2.6) | A (0.9) |
| Example 2 | A (52) | A (0.42) | A (28) | A (4.1) | A (0.7) |
| Example 3 | A (48) | A (0.30) | A (29) | A (3.0) | A (0.7) |
| Example 4 | A (48) | A (0.30) | A (26) | A (2.4) | A (0.7) |
| Example 5 | A (80) | A (1.0) | A (29) | A (2.5) | A (1.7) |
| Example 6 | A (72) | A (0.70) | A (30) | A (3.2) | A (1.7) |
| Comparative Example 1 | A (36) | A (1.3) | B (18) | C (12) | A (1.1) |
| Comparative Example 2 | B (16) | B (0.15) | A (32) | C (20) | B (2.3) |
| Comparative Example 3 | A (50) | A (0.45) | B (20) | A (1.6) | A (0.7) |
| Comparative Example 4 | B (15) | B (0.28) | B (24) | A (2.9) | A (1.3) |
| Comparative Example 5 | A (32) | B (0.21) | A (28) | A (3.8) | A (0.8) |
| Comparative Example 6 | A (49) | A (0.39) | B (21) | B (5.6) | A (1.0) |
| Comparative Example 7 | B (13) | B (0.19) | B (22) | A (1.9) | B (2.4) |

It was confirmed that the resin sheets formed of the ionomer resins obtained in Examples 1 to 6 were rated as "A", which is a good rating, in all of the evaluations of the self-supporting ability under a high-temperature environment, the strength after a long period of time, the low-temperature adhesiveness to glass, the transparency, and the colorability. On the other hand, the resin sheets formed of the ionomer resins obtained in Comparative Examples 1 to 7 were confirmed to be rated as "B", which is a poor rating, in at least one of the evaluations. The ionomer resin of the present invention can therefore form a resin sheet that is excellent in transparency and self-supporting ability under a high-temperature environment, has a low colorability, has sufficient adhesiveness to glass even when bonded to glass at a lower temperature than that in a conventional case, and can maintain high strength even after a long period of time.

The invention claimed is:

1. An ionomer resin, comprising:

a carboxylic acid ester unit (A);

a carboxylic acid unit (B);

a neutralized carboxylic acid unit (C); and an ethylene unit (D), wherein, the ionomer resin is derived from at least one ethylene-carboxylic acid ester copolymer (X) selected from the group consisting of an ethylene-methyl acrylate copolymer, an ethylene-methyl methacrylate copolymer, an ethylene-ethyl acrylate copolymer, an ethylene-ethyl methacrylate copolymer, an ethylene-n-propyl acrylate copolymer, an ethylene-n-propyl methacrylate copolymer, an ethylene-isopropyl acrylate copolymer, an ethylene-isopropyl methacrylate copolymer, an ethylenen-butyl acrylate copolymer, an ethylene-n-butyl methacrylate copolymer, an ethylene-sec-butyl acrylate copolymer, and an ethylene-sec-butyl methacrylate copolymer;

based on a total of monomer units constituting the ionomer resin, a content of the carboxylic acid ester unit (A) is 0.01 to 1.8 mol %, and a total content of the carboxylic acid ester unit (A), the carboxylic acid unit (B), and the neutralized carboxylic acid unit (C) is 6 to 10 mol %; and based on measurement of a molecular weight in terms of polyethylene by gel permeation chromatography with the carboxylic acid unit (B) and the neutralized carboxylic acid unit (C) being converted into a methyl carboxylate unit, the ionomer resin has a ratio of a low-molecular-weight component having a molecular weight of 2,500 g/mol or less obtained from an integral molecular weight distribution curve of 2.6 to 4.0 mass %, and a number average molecular weight of 8,000 to 14,000 g/mol.

2. The ionomer resin according to claim 1, wherein a content of the neutralized carboxylic acid unit (C) is 0.1 to 3.0 mol %.

3. The ionomer resin according to claim 1, wherein a content of the carboxylic acid unit (B) is 1.0 to 9.0 mol %.

4. The ionomer resin according to claim 1, wherein the carboxylic acid ester unit (A) is a (meth)acrylic acid ester unit.

5. A method for producing the ionomer resin according to claim 1, the method comprising:

saponifying a part of the ethylene-carboxylic acid ester copolymer (X) to obtain a saponified product; and demetallizing at least a part of the saponified product, wherein a content of a carboxylic acid ester unit contained in the ethylene-carboxylic acid ester copolymer (X) is 6 to 10 mol % based on a total of monomer units constituting the ethylene-carboxylic acid ester copolymer.

6. A resin composition, comprising:

90 mass % or more of the ionomer resin according to claim 1 with respect to a total mass of the resin composition.

7. A resin sheet, comprising:

the ionomer resin according to claim 1.

8. The resin sheet according to claim 7, having a relaxation modulus after $2.6\times10^6$ seconds based on a master curve prepared at 50° C. of 0.25 MPa or more.

9. A laminated glass, comprising:

two glass plates; and an interlayer film disposed between the two glass plates, wherein the interlayer film is the resin sheet according to claim 7.

10. A resin sheet, comprising:

the resin composition according to claim 6.

11. The resin sheet according to claim 10, having a relaxation modulus after $2.6\times10^6$ seconds based on a master curve prepared at 50° C. of 0.25 MPa or more.

12. A laminated glass, comprising:

two glass plates; and an interlayer film disposed between the two glass plates, wherein the interlayer film is the resin sheet according to claim 10.

* * * * *